(12) United States Patent  
Baker

(10) Patent No.: US 10,444,056 B2  
(45) Date of Patent: *Oct. 15, 2019

(54) LIQUID LEVEL SENSING DEVICE HAVING A PLURALITY OF EMITTER/RECEIVER PAIRS ON A CIRCUIT BOARD

(71) Applicant: Lat-Lon LLC, Denver, CO (US)

(72) Inventor: David Baker, Littleton, CO (US)

(73) Assignee: Lat-Lon LLC, Denver, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 15/797,635

(22) Filed: Oct. 30, 2017

(65) Prior Publication Data

US 2018/0045551 A1  Feb. 15, 2018

Related U.S. Application Data

(63) Continuation of application No. 14/870,974, filed on Sep. 30, 2015, now Pat. No. 9,804,015.

(51) Int. Cl.
*G01F 23/292* (2006.01)
*G01C 9/02* (2006.01)

(52) U.S. Cl.
CPC ............ *G01F 23/292* (2013.01); *G01C 9/02* (2013.01)

(58) Field of Classification Search
CPC ..... G01N 27/223; G01N 27/121; G01F 23/26
USPC ................................................. 250/221, 577
See application file for complete search history.

(56) References Cited

U.S. PATENT DOCUMENTS

| 6,925,871 B2 | 8/2005 | Frank |
| 7,482,818 B2 * | 1/2009 | Greenwald ......... A61M 1/3626 324/639 |
| 9,279,711 B1 | 3/2016 | Guldalian |
| 2017/0089749 A1 | 3/2017 | Baker |

* cited by examiner

*Primary Examiner* — Que Tan Le  
(74) *Attorney, Agent, or Firm* — Mark H. Whittenberger; Holland & Knight LLP

(57) ABSTRACT

The present disclosure relates to an apparatus and method for liquid level detection. The method may include providing a circuit board including a plurality of horizontally mounted emitter/receiver pairs arranged vertically along the circuit board within a liquid containment area. The method may further include determining, using one or more processors associated with the circuit board, if liquid is present between each of the plurality of emitter/receiver pairs based upon, at least in part, data received from one or more of the plurality of emitter/receiver pairs.

26 Claims, 19 Drawing Sheets

100
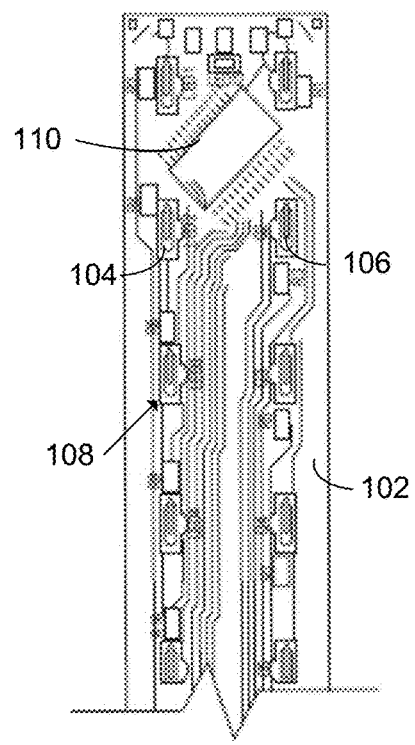
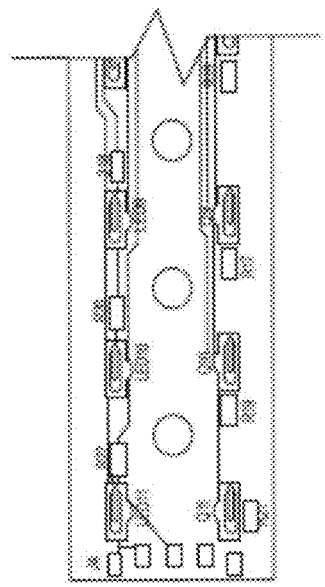
FIG. 1

1300

1400

LIQUID LEVEL SENSING DEVICE HAVING A PLURALITY OF EMITTER/RECEIVER PAIRS ON A CIRCUIT BOARD

FIELD OF THE INVENTION

The present disclosure relates to liquid level sensors, and more specifically, to a digital, transmissive, optical fuel level probe.

DISCUSSION OF THE RELATED ART

Existing approaches in the field of fuel level detection have various shortcomings. For example, ultrasonic fuel sensors require a settled fluid surface, devoid of foam, to render a clean and on-target echo off the top of the fluid back to the sensor's microphone. Hence, they require a settling tube for reliable operation in moving vehicles. Further, capacitive fuel sensors may have their scale factor drift as they age or as different fuel mixes are introduced into the tank. Both ultrasonic and capacitive fuel sensors must be calibrated with a scale factor which converts a time or frequency into a fuel level.

SUMMARY OF INVENTION

In one or more embodiments of the present disclosure a liquid level detection apparatus is provided. The apparatus may include a circuit board including a plurality of horizontally mounted emitter/receiver pairs arranged vertically along the circuit board. The apparatus may further include a processor configured to determine if liquid is present between each of the plurality of emitter/receiver pairs based upon, at least in part, data received from one or more of the plurality of emitter/receiver pairs.

One or more of the following features may be included. In some embodiments, the apparatus may include a support tube configured to house the circuit board and the processor. In some embodiments, the support tube may be configured to be deployed within a liquid storage tank. In some embodiments, determining if liquid is present may include determining a collector voltage at a photo transistor receiver associated with each of the plurality of emitter/receiver pairs. The plurality of emitter/receiver pairs may each be separated by an approximately equivalent distance on the circuit board. The circuit board may include a plurality of circuit boards that are electrically connected. The support tube may be one of a straight support tube and a curved support tube. In some embodiments, determining if liquid is present may include determining a level of liquid in a confined space. The circuit board may be a single circuit board including at least one of a plurality of processors, a ladder circuit, and/or other components. Each of the plurality of emitter/receiver pairs may be included within one or more corner reflecting sensors.

In some embodiments, a method for liquid level detection is provided. The method may include providing a circuit board including a plurality of horizontally mounted emitter/receiver pairs arranged vertically along the circuit board within a liquid containment area. The method may also include determining, using one or more processors associated with the circuit board, if liquid is present between each of the plurality of emitter/receiver pairs based upon, at least in part, data received from one or more of the plurality of emitter/receiver pairs.

One or more of the following features may be included. In some embodiments, the circuit board may be enclosed within a support tube configured to house the circuit board and the processor. The method may further include deploying the support tube within a liquid storage tank. In some embodiments, determining if liquid is present may include determining a collector voltage at a photo transistor receiver associated with each of the plurality of emitter/receiver pairs. The plurality of emitter/receiver pairs may each be separated by an approximately equivalent distance on the circuit board. The circuit board may include a plurality of circuit boards that are electrically connected. The support tube may be one of a straight support tube and a curved support tube. In some embodiments, determining if liquid is present may include determining a level of liquid in a confined space. The circuit board may be a single circuit board including at least one of a plurality of processors, a ladder circuit, and/or other components. In some embodiments, each of the plurality of emitter/receiver pairs may be included within one or more corner reflecting sensors.

Additional features and advantages of embodiments of the present disclosure will be set forth in the description which follows, and in part will be apparent from the description, or may be learned by practice of embodiments of the present disclosure. The objectives and other advantages of the embodiments of the present disclosure may be realized and attained by the structure particularly pointed out in the written description and claims hereof as well as the appended drawings.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the present disclosure and are incorporated in and constitute a part of this specification, illustrate embodiments of the present disclosure and together with the description serve to explain the principles of embodiments of the present disclosure.

FIG. 1 is a schematic depicting aspects of a liquid level detection apparatus in accordance with an embodiment of the present disclosure;

DETAILED DESCRIPTION

Figure 2:
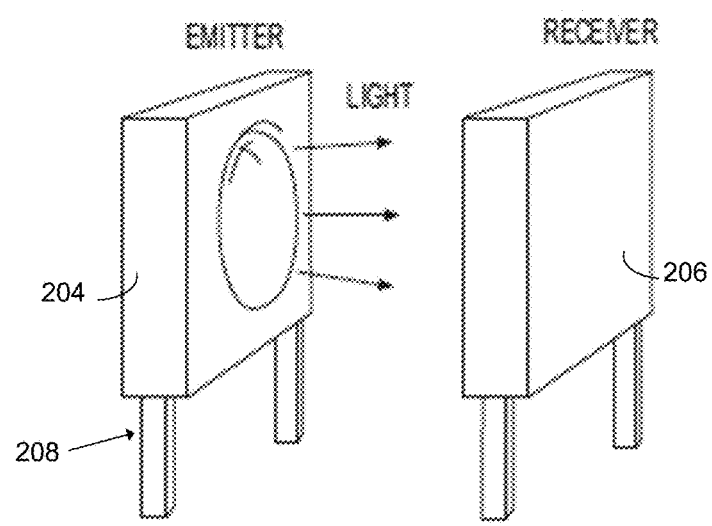
FIG. 2 is a schematic depicting an emitter and receiver pair in accordance with an embodiment of the present disclosure.

Reference will now be made in detail to the embodiments of the present disclosure, examples of which are illustrated in the accompanying drawings. The present disclosure may, however, be embodied in many different forms and should not be construed as being limited to the embodiments set forth herein. Rather, these embodiments are provided so that this disclosure will be thorough and complete, and will fully convey the concept of the disclosure to those skilled in the art.

Referring to FIG. 1, in one or more embodiments of the present disclosure a liquid level detection apparatus 100 is provided. The liquid level detection apparatus 100 may include a circuit board 102 including a plurality of mounted emitters 104 and receivers 106 arranged along the circuit board. In one example, the circuit board 102 can be 5.5 inches. However, any suitable length may be employed without departing from the scope of the present disclosure. In another embodiment, the emitters 104 and receivers 106 can be arranged in emitter/receiver pairs 108. In another embodiment, each emitter/receiver pair 108 may be horizontally mounted on the circuit board 102. In another embodiment, the emitter/receiver pairs 108 may be arranged vertically along the circuit board 102.

Referring also to FIG. 2, in some embodiments, each emitter/receiver pair 208 can include a light emitting diode (LED) and a photo transistor. In one embodiment, each emitter/receiver pair can be separated by a small gap where liquid may or may not be present. The emitter 204 and/or the receiver 206 can be encapsulated in plastic. An example of a plastic used for encapsulation of the emitter and/or the receiver can be epoxy. The emitters 204 and receivers 206 can include focusing optics as part of the epoxy encapsulation. In a non-limiting example, the emitter can emit infrared light to the receiver 206. However, any other wavelength of light may be used as an alternative, including but not limited to: visible light, ultraviolet light, x-rays, gamma rays, etc. In one embodiment, the receiver can be a light detecting component such as a photodiode.

In some embodiments, each of the plurality of emitter/receiver pairs 208 may be included within one or more corner reflecting sensors. The liquid level detection apparatus can be include corner-reflecting fluid sensors that contain both the emitter 204 and receiver 206 within one device. In these corner reflecting fluid sensors, the presence of the liquid can block the reflection of the light and can cause the light to leave the device and not reflect back to the sensor.

Figure 3:
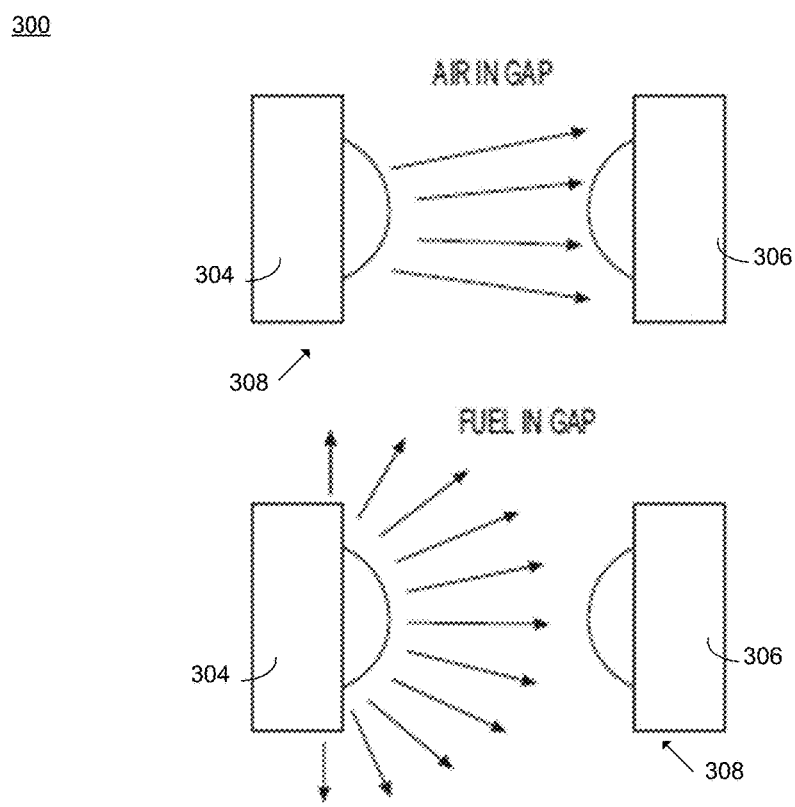
FIG. 3 is a schematic depicting an emitter and receiver pair in accordance with an embodiment of the present disclosure.

Referring also to FIG. 3, in various embodiments, the liquid level detection apparatus 300 can use a difference in optical refractive properties of a wavelength of light between epoxy/plastic and air or any liquid. An example of a liquid can be petroleum or any petroleum product. In one example, the focusing process can be disrupted when the liquid level detection apparatus is immersed in liquid because the refractive properties can change drastically as the light transitions from the epoxy/plastic lens of the emitter 304 into the liquid. A subsequent lack of focusing can cause the light emitted to fall upon the receiver 306 with reduced intensity when immersed in liquid.

In one embodiment, the liquid level detection apparatus 300 can operate without calibration of scale factor because it may directly measure the presence of a liquid at periodic distance intervals. Therefore, the liquid level measurement can be taken in the desired final units of distance instead of resistance, frequency, time-delay or some other sensing metric. Converting to units of volume given distance may not vary over time or liquid type.

In one example, sloshing liquid can render an acoustic sensor inoperative. Sloshing liquid may not cause any problems for the liquid level detection apparatus 300, other than measurements varying from sample-to-sample. The liquid level detection apparatus 300 can take up less space inside a tank allowing for greater installation flexibility. The liquid level detection apparatus 300 may not need to be vertically oriented within a tank to function. The liquid level detection apparatus 300 can be mounted on a sloping surface or can even be broken into electrically connected, but physically separated segments.

Figure 13:
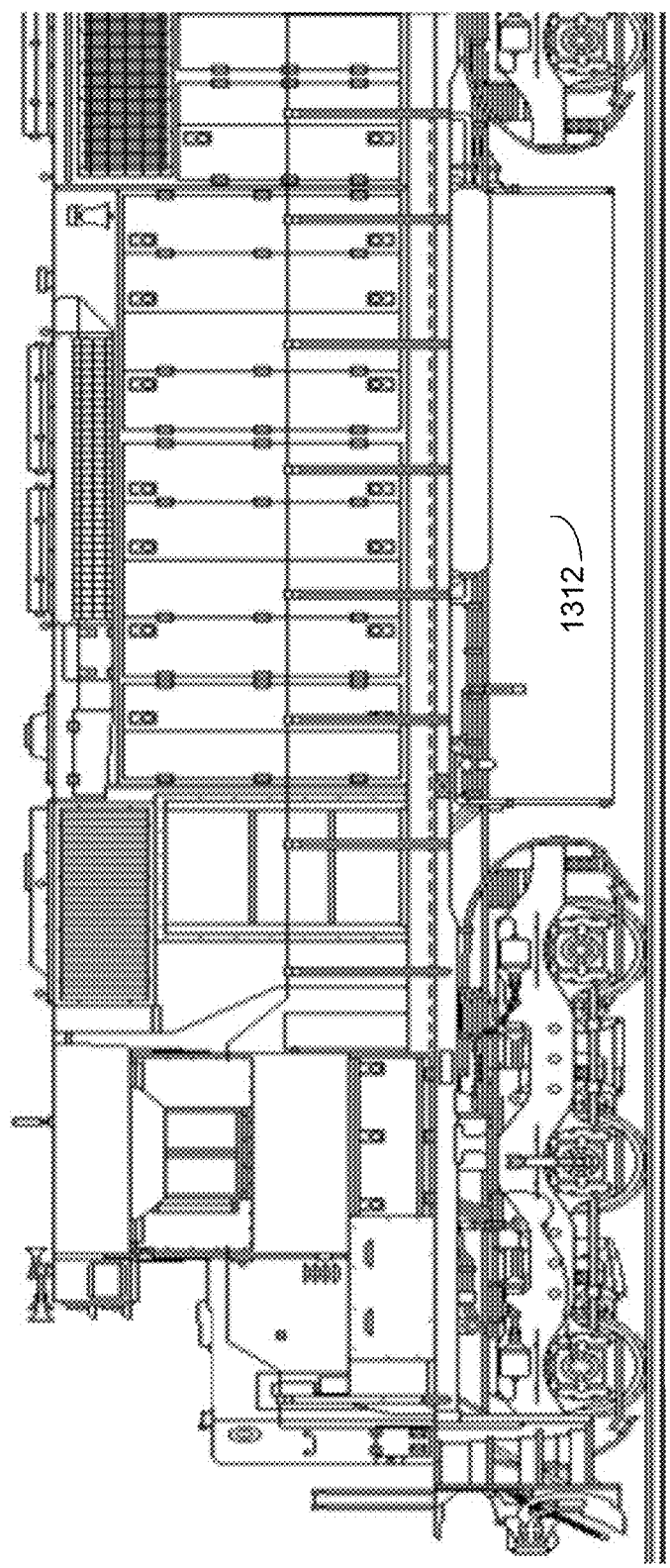
FIG. 13 is a schematic depicting a locomotive fuel tank in accordance with an embodiment of the present disclosure.

In one example, any possible reduction in precision of liquid level measurement, when compared to analog measurements, can be overcome with an averaging algorithm wherein multiple samples are taken and averaged. This can increase the precision of the liquid level reading located in between the emitter/receiver pairs 308 to any precision required. In one example, in a liquid tank located on a moving vehicle, the sloshing of liquid within the tank can serve to increase the liquid level detection apparatus's 300 precision. An example of a liquid tank can be a locomotive fuel tank 1312 as shown in FIG. 13.

Referring again to FIG. 1, in some embodiments, the liquid level detection apparatus 100 may further include a processor 110 configured to determine if liquid is present between each of the plurality of emitter/receiver pairs 108 based upon, at least in part, data received from one or more of the plurality of emitter/receiver pairs 108.

Figure 4:
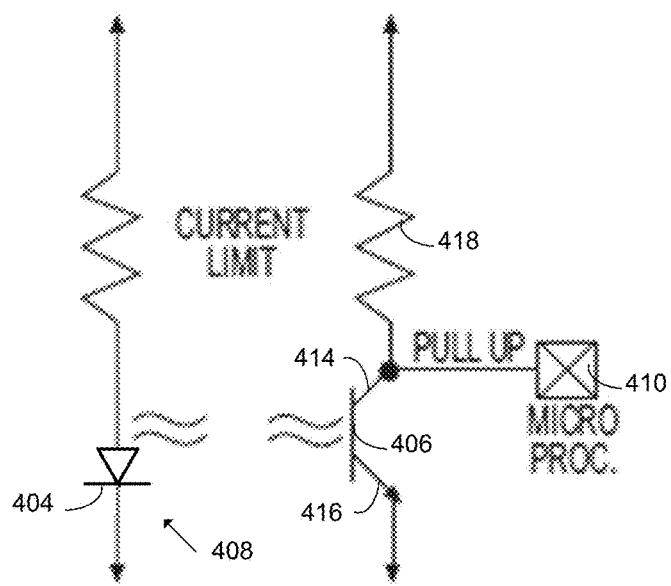
FIG. 4 is a schematic depicting aspects of exemplary circuitry of a liquid level detection apparatus in accordance with an embodiment of the present disclosure.

Referring also to FIG. 4, in some embodiments, determining if a liquid is present may include determining a collector voltage at the receiver 406 associated with each of the plurality of emitter/receiver pairs 408. The presence of liquid can be detected by the fact that the receiver 406 can remain in an unexcited base state and may not allow current to flow from the receiver collector 414 to the receiver emitter 416. By adding a pull-up resistor 418 to the receiver collector 414, the collector voltage can be measured by the processor 410 as a digital input that can be high when liquid is present and can be low when air is present between the emitter/receiver pair 408.

Figure 5:
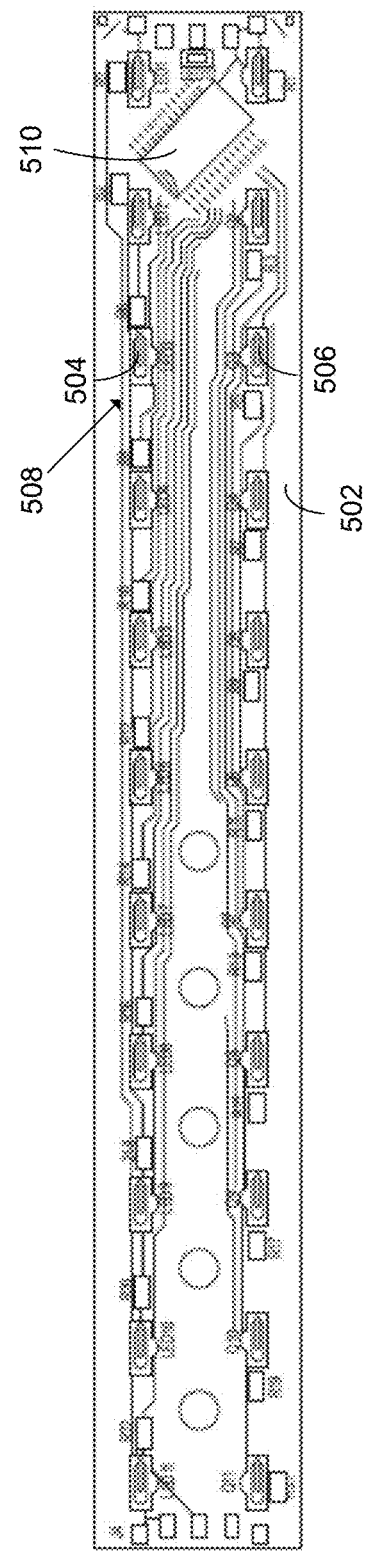
FIG. 5 is a schematic depicting aspects of a liquid level detection apparatus in accordance with an embodiment of the present disclosure.

Referring also to FIG. 5, in some embodiments, the liquid level detection apparatus 500 can include a plurality of emitter/receiver pairs 508 that may each be separated by an approximately equivalent distance on the circuit board 502. Each circuit board 502 can include its own processor 510. In one example, each circuit board 502 can have eleven emitter/receiver pairs 508. In another example, each emitter/receiver pair 508 can be configured with a half-inch gap between each adjacent emitter/receiver pair 508. However, any number of emitter/receiver pairs 508 and other suitable gap distances are also within the scope of the present disclosure.

In another embodiment, the plurality of emitter/receiver pairs 508 can be separated by an irregular distance. In another embodiment, the plurality of emitter/receiver pairs 508 can be separated such that the distance between each of the plurality of emitter/receiver pairs can correspond to an equivalent change in the liquid level or volume. In one example, the liquid level detection apparatus 500 can be deployed in a V-shaped liquid tank. The distance between emitter/receiver pairs 508 can decrease as the emitter/receiver pairs 508 are further away from the center of the V-shaped tank. The decreased distance between the emitter/receiver pairs 508 can correlate to a constant change in volume between emitter/receiver pairs 508. While a V-shaped tank has been discussed, any additional tank shape with variable distances between emitter/receiver pairs are also within the scope of the present disclosure.

Figure 6:
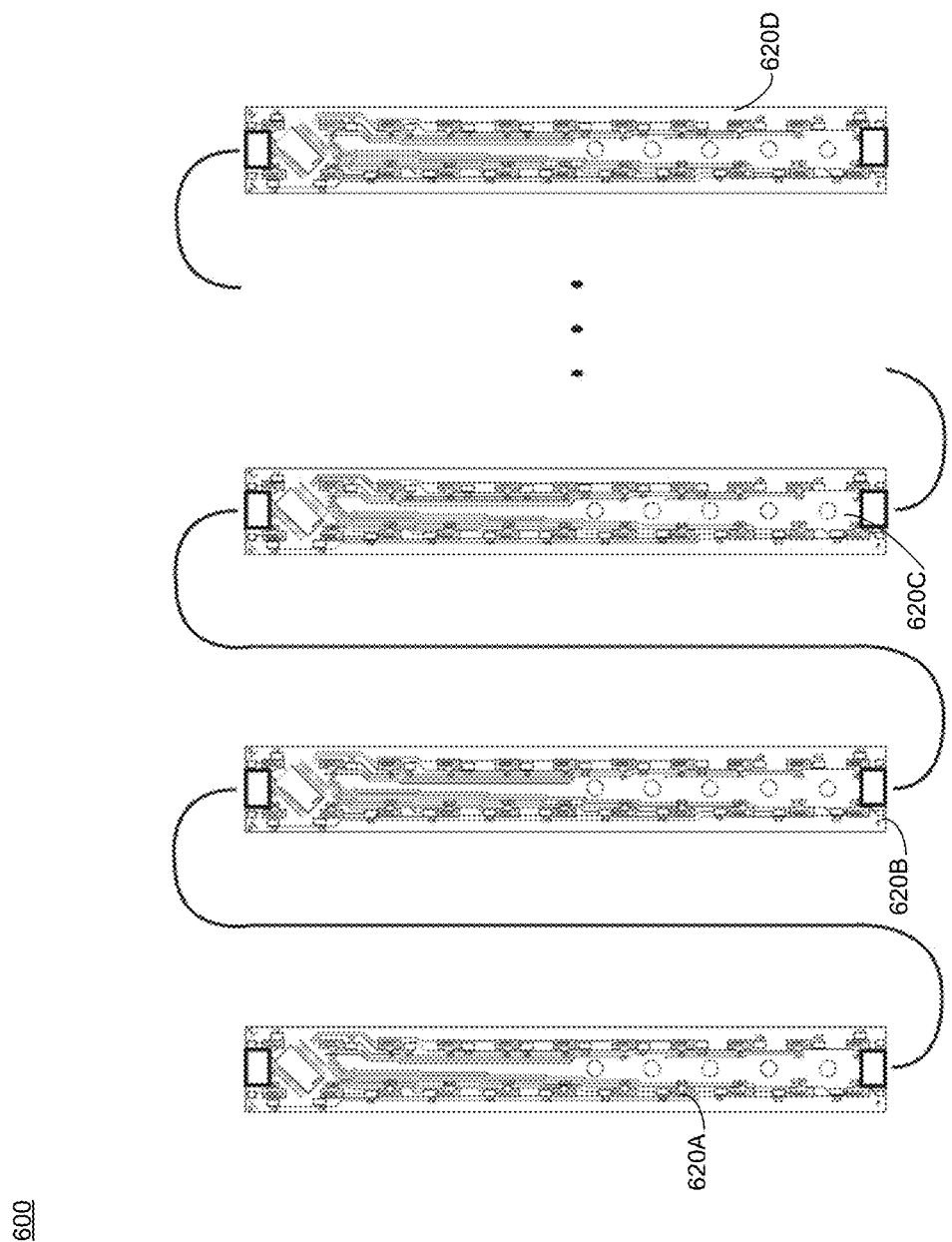
FIG. 6 is a schematic depicting an exemplary combination of liquid level detection apparatuses in accordance with an embodiment of the present disclosure.

Referring also to FIG. 6, in some embodiments, the liquid level detection apparatus 600 may include a plurality of circuit boards 620A, 620B, 620C, 620D that are electrically connected. In one embodiment, a plurality of circuit boards 620A, 620B, 620C, 620D can be "daisy-chained" together to make a liquid level detection apparatus 600 of any length. In one embodiment, a plurality of circuit boards 620A, 620B, 620C, 620D can include at least a top circuit board 620A and a bottom circuit board 620D. In another embodiment, the top circuit board 620A can correspond to the highest circuit board of the plurality of circuit boards. In another embodiment, the bottom circuit board 620D can correspond to the lowest circuit board of the plurality of circuit boards.

Figure 15:
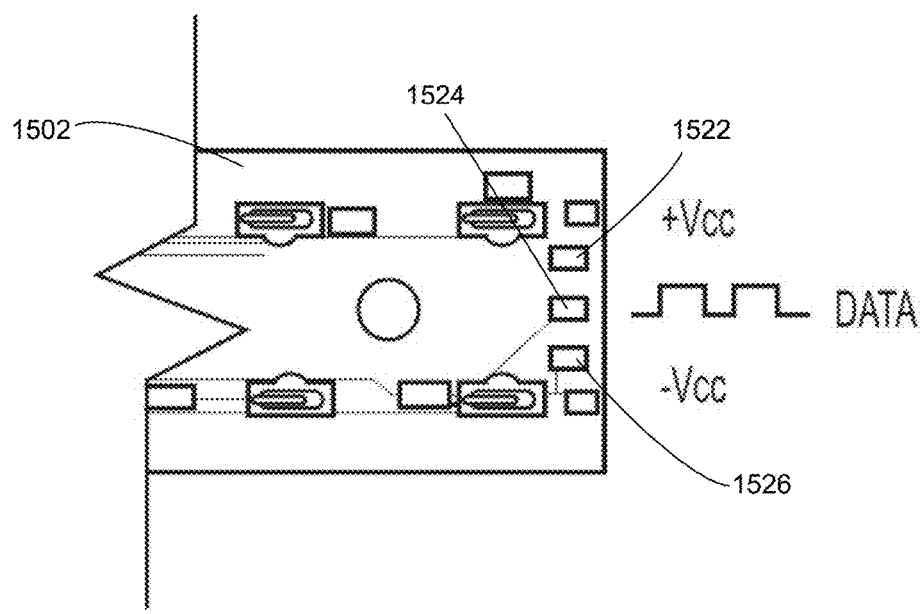
FIG. 15 is a schematic depicting aspects of a liquid level detection apparatus in accordance with an example.

Referring also to FIG. 15, in some embodiments, each end of the circuit board 1502 can include three electrical pads. In one example, the electrical pads can be used for power 1522, data 1524, and ground 1526.

Figure 7:
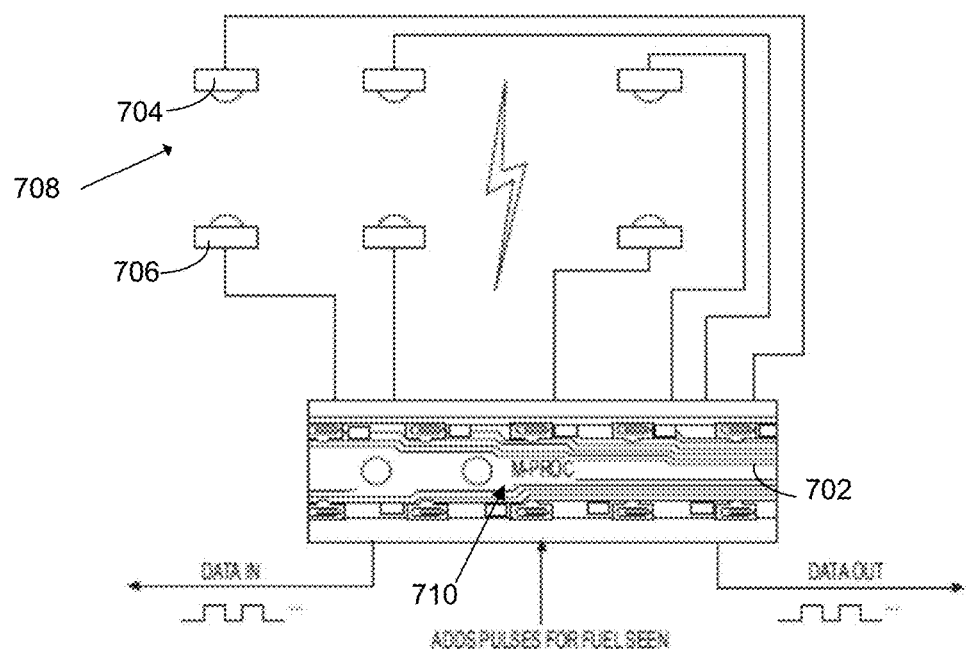
FIG. 7 is a schematic depicting aspects of a liquid level detection apparatus in accordance with an embodiment of the present disclosure.

Referring also to FIG. 7, in some embodiments, the processor 710 can detect pulses from a circuit board 702 connected below. Upon detection of a pulse, the processor 710 can count the pulses received. The processor 706 can power a first emitter/receiver pair 708, wait a pre-determined waiting period, and determine if the receiver has detected liquid. A predetermined waiting period can be the time required by the receiver to respond to the emitter. However, other waiting periods may be employed without departing from the scope of the present disclosure. The processor 710 can repeat this process for the remaining emitter/receiver pairs 708. The processor 710 can add the count of liquid-present pulses to the pulses detected from a connected circuit board 702. The processor 710 can send the combined pulse count out the other end of the circuit board 702 for the next circuit board 702 up to receive and repeat the process.

Referring again to FIG. 6, a bottom board, in a group of electrically connected circuit boards 620A, 620B, 620C, 620D, can be loaded with a different algorithm. In one example, the bottom circuit board 620D may have a timer that initiates the liquid detection and reporting process instead of detecting pulses from a circuit board below it.

Figure 17:
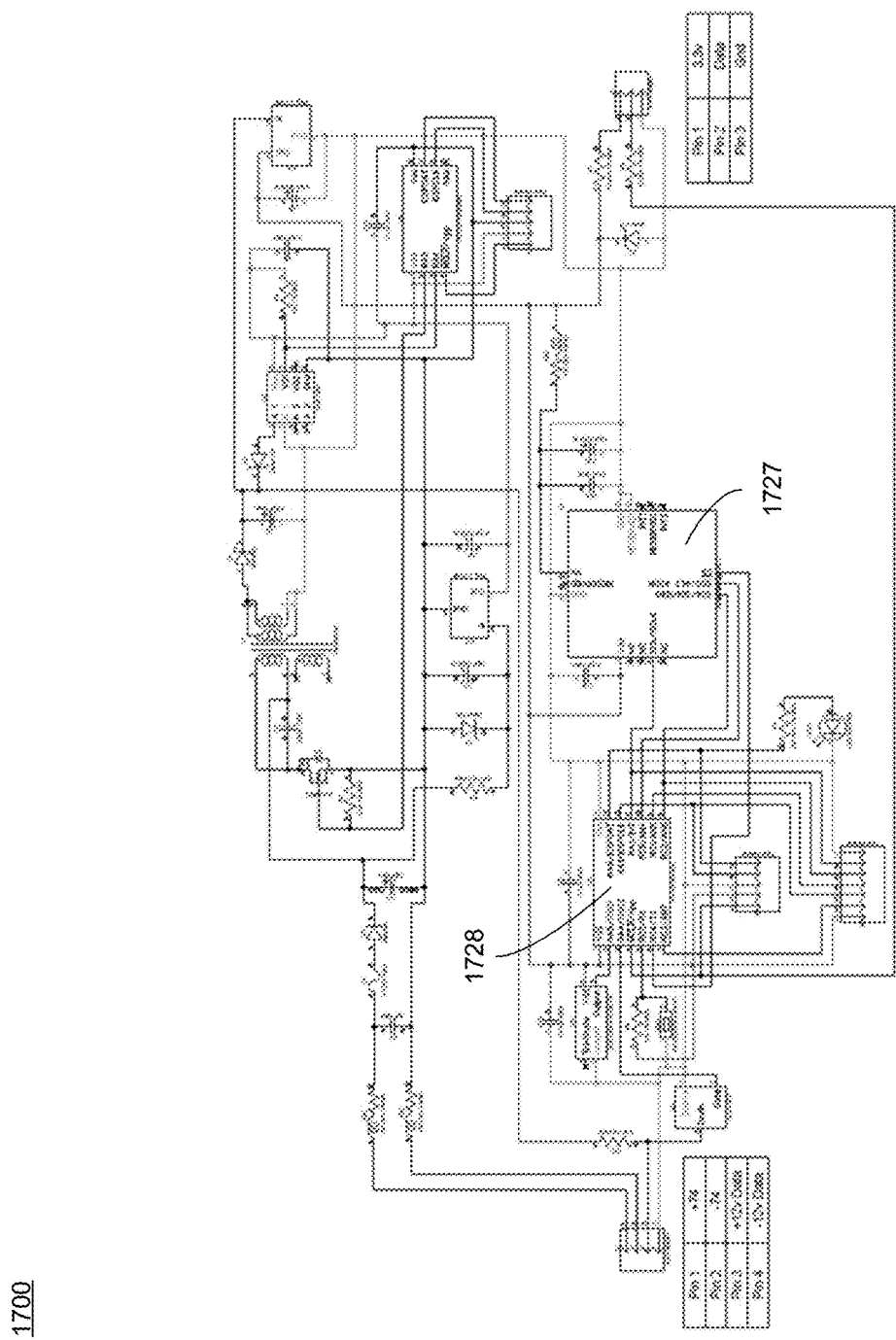
FIG. 17 is a schematic depicting a second circuit board of the liquid level detection apparatus in accordance with an embodiment of the present disclosure.
Figure 18:
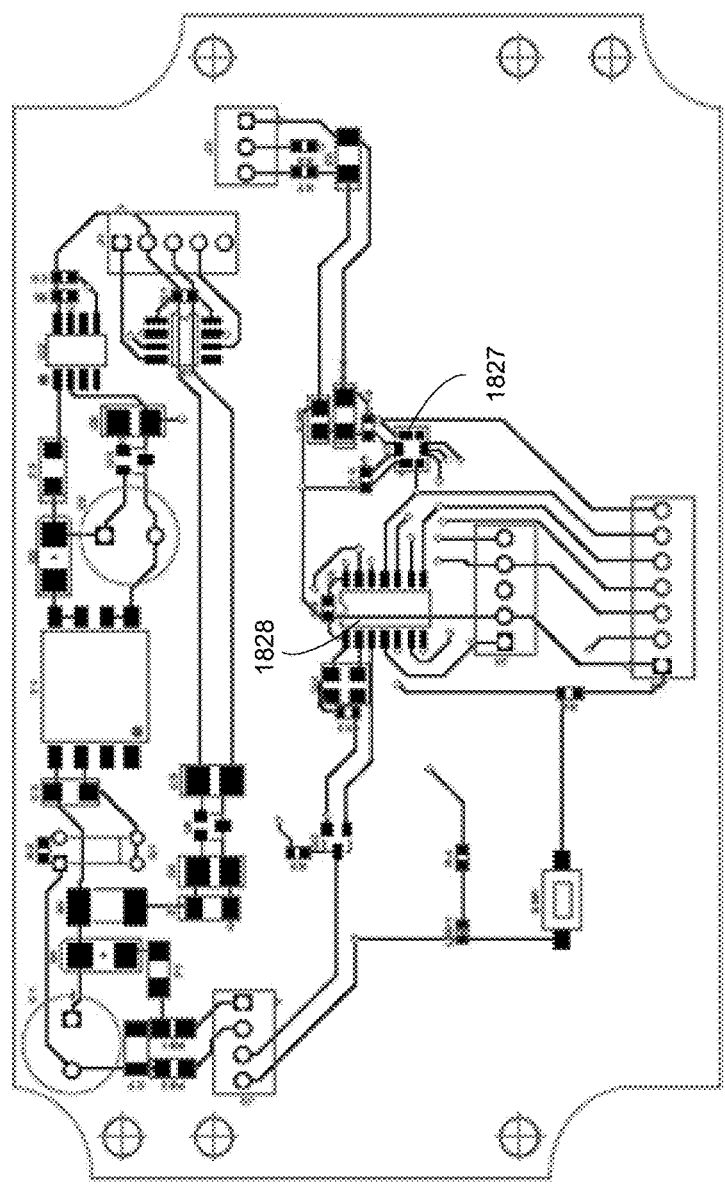
FIG. 18 is a schematic depicting the second circuit board including an accelerometer in accordance with an embodiment of the present disclosure.
Figure 19:
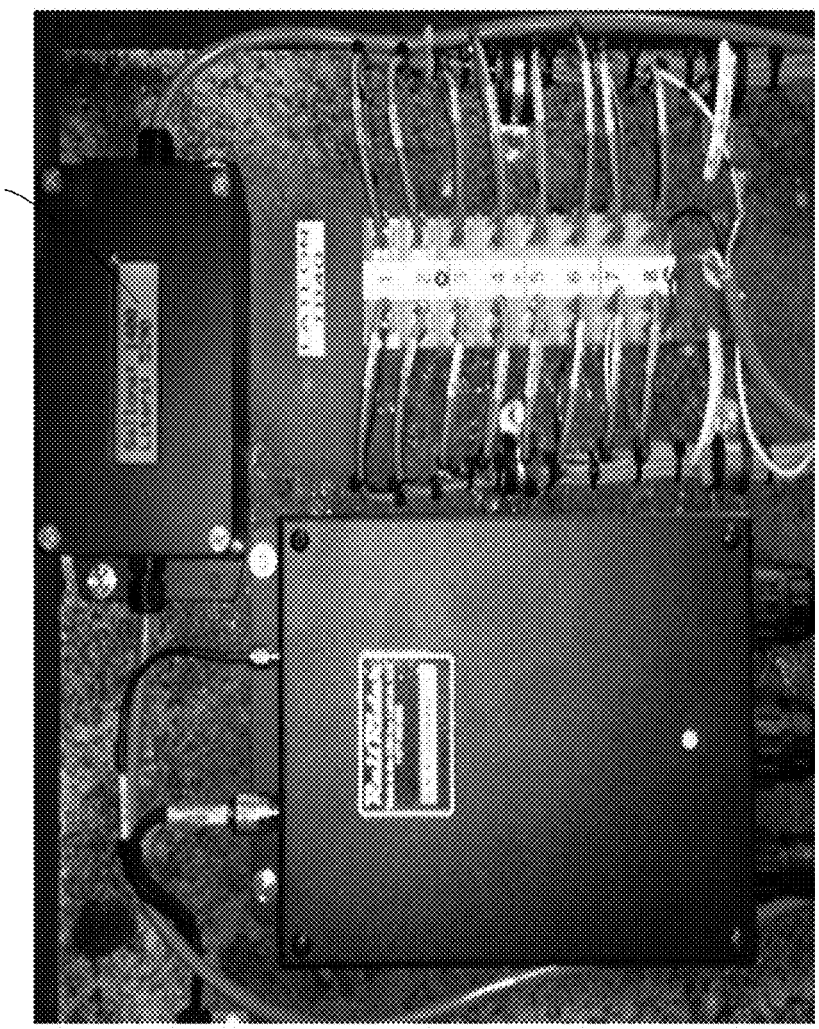
FIG. 19 is a schematic depicting a display of the measured liquid level in accordance with an embodiment of the present disclosure.

Referring also to FIGS. 6, 17, and 18, in some embodiments, a second circuit board 1700 may include a processor 1727 electrically coupled to the top circuit board's 620A output data stream. In one embodiment, the processor can also provide power for the plurality of circuit boards. In one example, the liquid level detection apparatus can be electrically grounded to a liquid tank. The second circuit board 1700 can act as an isolated power supply for the liquid level detection apparatus 600 to allow the liquid level detection apparatus 600 to remain electrically isolated. This processor 1727 can read the pulses coming from the top circuit board 620A and convert the distance of liquid measured into a volume of liquid. In one example, the distance of liquid measured can be the distance from the bottom of a liquid tank. In another example, the volume of liquid can be gallons and/or liters. The second circuit board 1700 can also perform averaging of liquid levels given multiple discrete measurements. Referring also to FIG. 19, the second circuit board 1700 can also display on a screen 1929 the liquid level to a human user. In one example, the liquid level can be displayed on the screen 1929 via an LCD, LED display, or ASCII based value. It can further reformat the liquid reading into a data format that might be needed elsewhere in the vehicle. For example, on a locomotive, a certain data structure can be required to feed into an active automatic equipment identification (AEI) tag. In another embodiment, the second circuit 1700 board can convert the pulse count into a machine-readable format.

In some embodiments, the second circuit board 1700, 1800 can further include an accelerometer 1728, 1828 to detect the tilt angle of the liquid tank to correct for liquid that may not be sitting square in the tank, but may be tilted to one end or the other. The accelerometer 1728, 1828 can detect one or more tilt angles for a plurality of correction parameters. Examples of the detected tilt angles may include, but are not limited to, tilting along the pitch (along-track) axis and roll (cross-track) axis. For example, as shown in FIG. 13, a locomotive fuel tank 1312 can be 20 feet long. If a locomotive fuel tank 1312 is located on a track that has a one percent grade, then the liquid level reading can be off by 20*0.01*12=2.4 inches. At 100 gallons per inch, this can be a significant error. The accelerometer 1728, 1828 can detect the one or more tilt angles and apply a correction parameter to account for the detected grade. In another example, the accelerometer 1728, 1828 can detect a tilt angle and provide correction to the liquid level for a non-stationary liquid tank. An example of a non-stationary liquid tank can be a locomotive fuel tank 1312 as shown in FIG. 13. In another embodiment, the circuit board 102 can include the accelerometer 1728, 1828.

Figure 8:
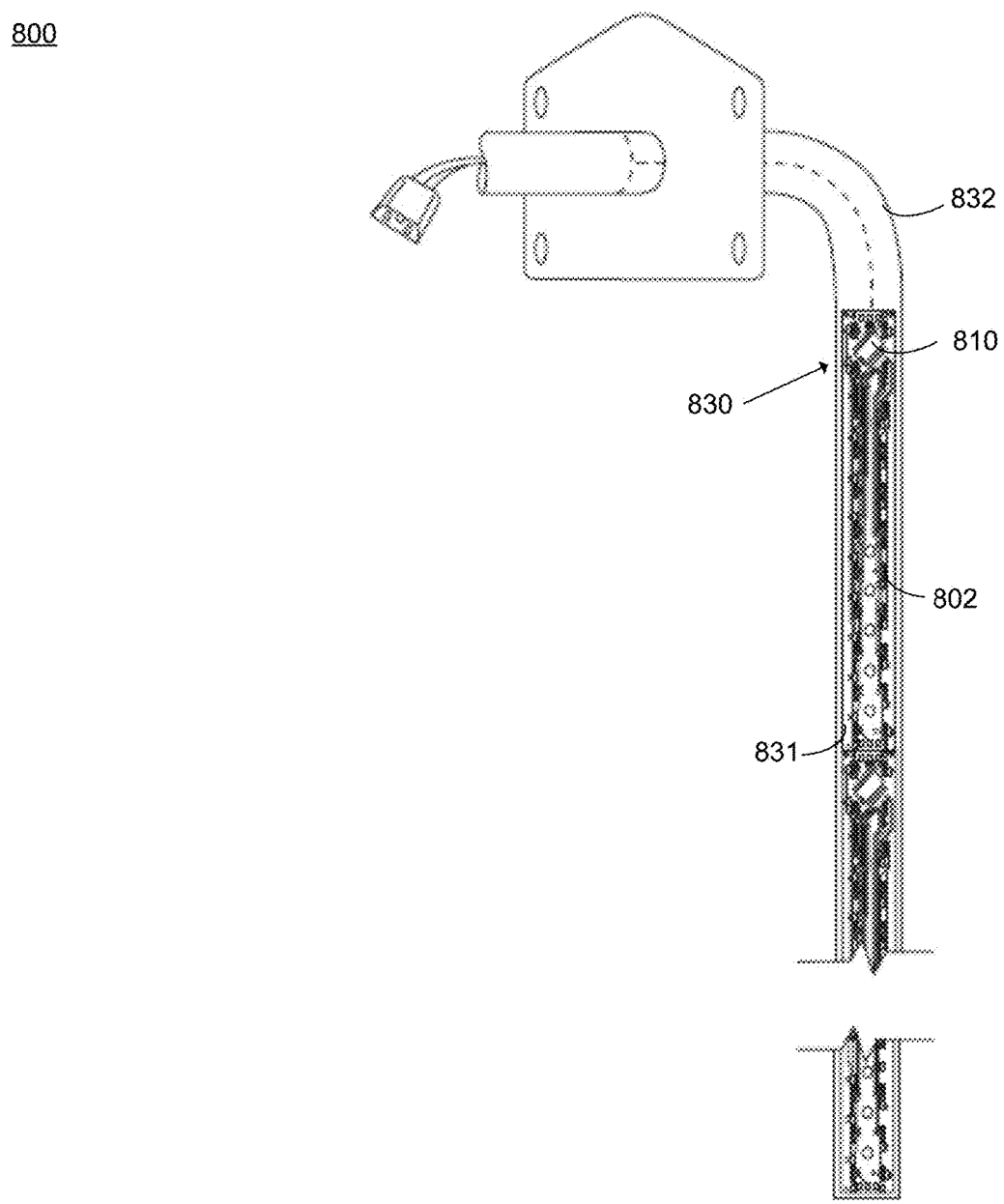
FIG. 8 is a schematic depicting exemplary deployment of a liquid level detection apparatus in an enclosure in accordance with an embodiment of the present disclosure.
Figure 9:
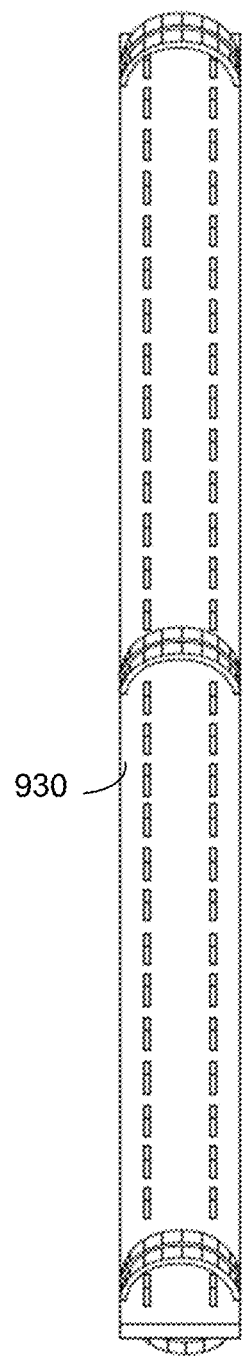
FIG. 9 is a schematic depicting a liquid level detection apparatus positioned in a straight tube in accordance with an embodiment of the present disclosure.

Referring also to FIGS. 8-9, in some embodiments, the liquid level detection apparatus may include a support tube 830 configured to house the circuit board 802 and the processor 810. In some embodiments, the support tube may be configured to be deployed within a liquid storage tank. In one example, determining if liquid is present may include determining a level of liquid in a confined space. In one embodiment, mounting the electrically-connected circuit boards 802 in a tube 830, can reduce any liquid sloshing, eliminate any stray light, and/or provide a support structure for the circuit boards 802. A straight tube version 831 can also be supplied for access to a liquid tank from a specific location. An example of a specific location to access a liquid tank may include, but is not limited to, the top of the liquid tank. One or more holes can be drilled in the top of the tube to allow fluid to fill the tube 830 without trapping air or creating a pressure differential across the tube. In one example, the support tube 830 can be configured for entering the liquid storage tank from a side. In another example, the support tube can be configured for entering from a side near the top of the liquid storage tank. In one embodiment, the support tube 830 may be one of a straight support tube 831 and a curved support tube 832.

Figure 10:
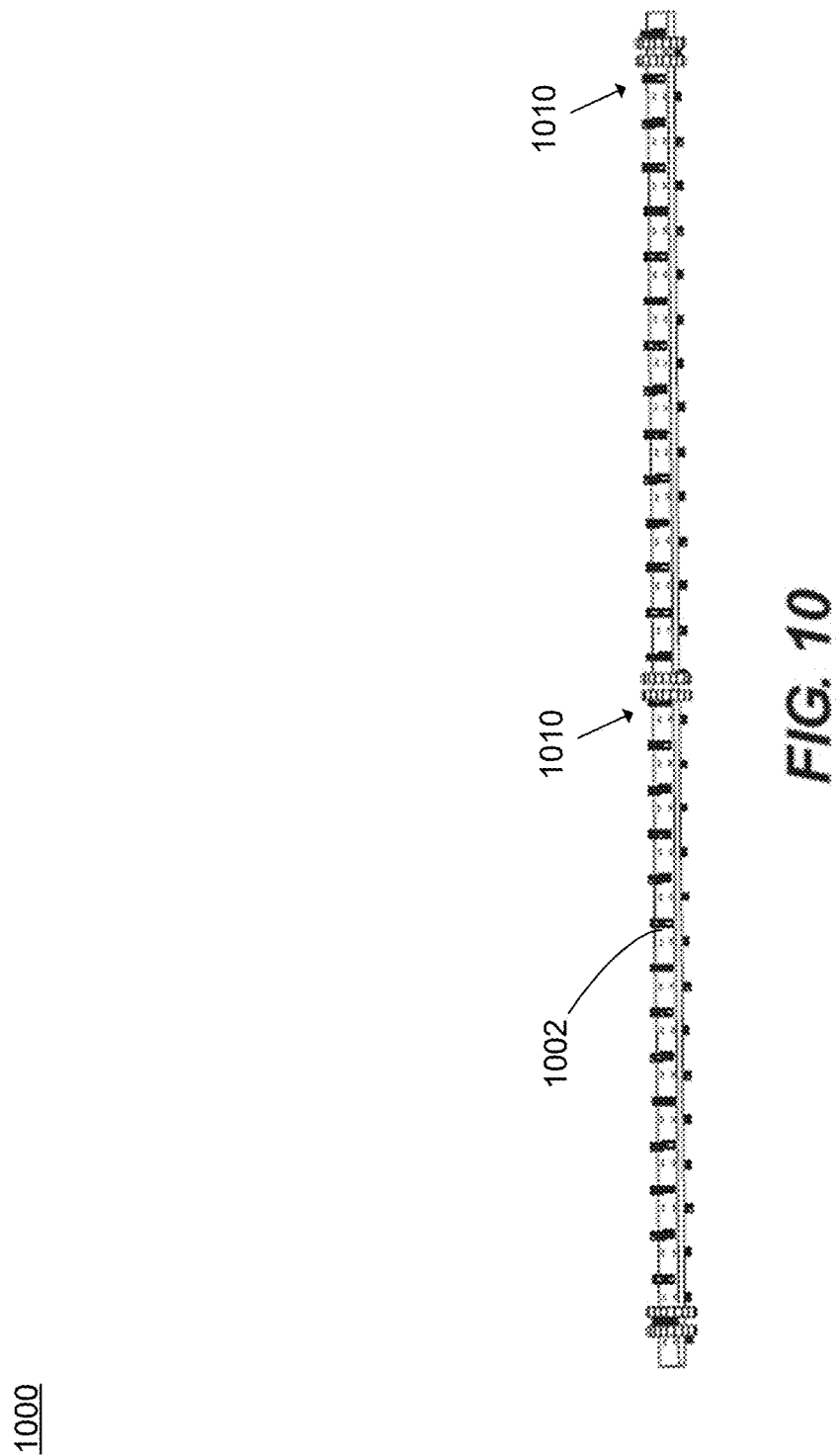
FIG. 10 is a schematic depicting a liquid level detection apparatus as a single circuit board in accordance with an embodiment of the present disclosure.
Figure 11:
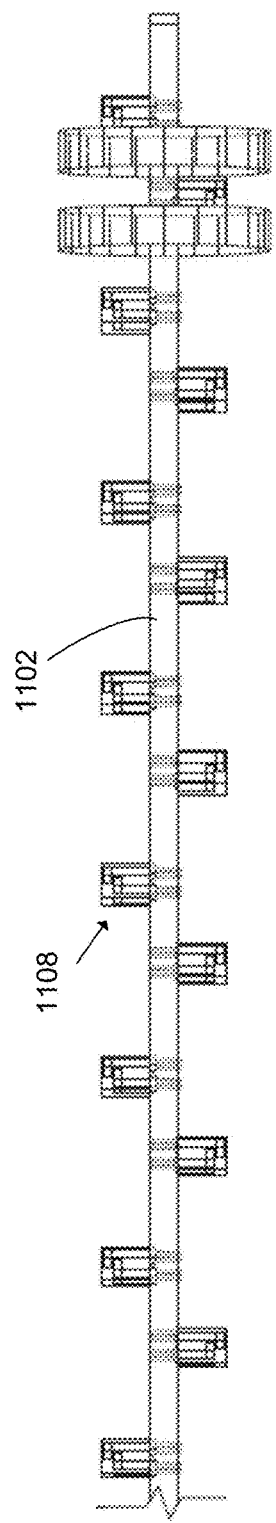
FIG. 11 is a schematic depicting aspects of a liquid level detection apparatus in accordance with an embodiment of the present disclosure.

Referring also to FIGS. 10-11, in some embodiments, the liquid level detection apparatus 1000 can be built using a single circuit board 1002 with multiple processors 1010 located along the circuit board 1002 as needed given the components to connect and the pin count.

Figure 12:
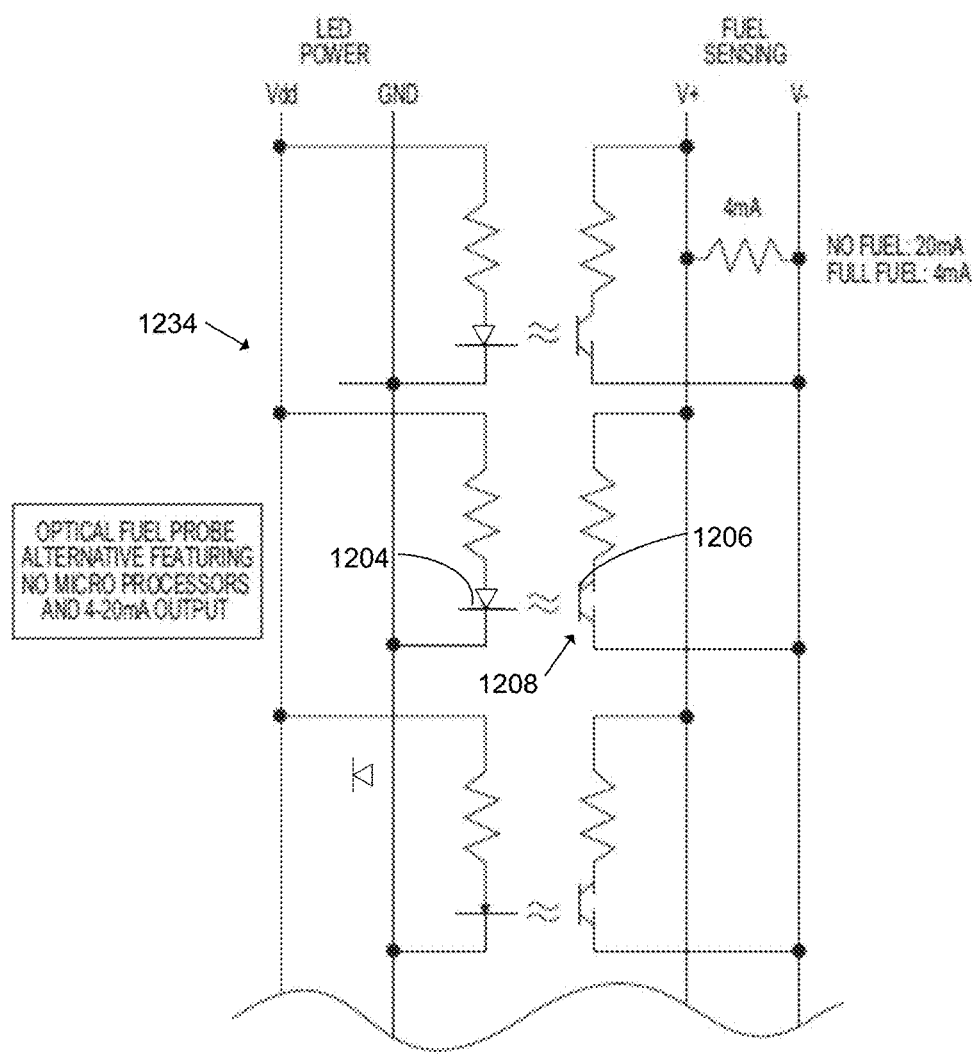
FIG. 12 is a schematic depicting exemplary circuitry of the liquid level detection apparatus in accordance with an embodiment of the present disclosure.

Referring also to FIG. 12, in some embodiments, the circuit board may be a single circuit board including at least one of a plurality of processors, one or more ladder circuits 1234, and/or other components. The liquid level detection apparatus 1200 can include a circuit board as a resistor ladder 1234 wherein each active receiver 1206 of one or more ladder circuits 1234 adds current draw in a ladder circuit 1234. The total current draw can be measured to determine a liquid level. In one example, when no liquid is detected, the output current can be 4 milliamps. When the liquid tank is full, the output current can be 20 milliamps. In one embodiment, the liquid level detection apparatus can use the current draw of one or more ladder circuits 1234 to determine a liquid level without using a processor to count pulses. In other words, by measuring the combined current draw of one or more ladder circuits 1234, the liquid level can be determined without a processor. In one example, the second circuit can be electrically coupled to convert the current draw of the one or more ladder circuits to a liquid level reading as a volume of gallons and/or liters.

Figure 14:
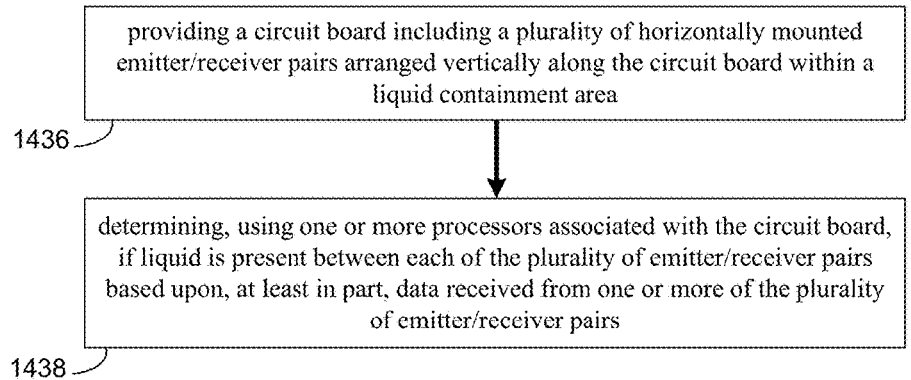
FIG. 14 is an illustrative flowchart of the process for liquid level detection in accordance with an embodiment of the present disclosure.

Referring also to FIG. 14, in some embodiments, a method 1400 for liquid level detection is provided. The method may include providing 1436 a circuit board including a plurality of horizontally mounted emitter/receiver pairs arranged vertically along the circuit board within a liquid containment area.

The method may also include determining, 1438 using one or more processors associated with the circuit board, if liquid is present between each of the plurality of emitter/receiver pairs based upon, at least in part, data received from one or more of the plurality of emitter/receiver pairs.

In some embodiments, the circuit board 102 may be enclosed within a support tube 802 configured to house the circuit board 102 and the processor 110. The method may further include deploying the support tube 830 within a liquid storage tank. In some embodiments, determining 1438 if liquid is present may include determining a collector voltage at a receiver associated with each of the plurality of emitter/receiver pairs 108.

The plurality of emitter/receiver pairs 108 may each be separated by an approximately equivalent distance on the circuit board 102. In another embodiment, the plurality of emitter/receiver pairs 108 may each be separated by a variable distance on the circuit board 102 corresponding to an equivalent change in liquid level. The circuit board 102 may include a plurality of circuit boards 102 that are electrically connected. The circuit board 102 can be electrically coupled to a second circuit board 1700. The second circuit board 1700 can convert the data received from one or more circuit boards to determine a liquid level measurement in volume. The second circuit board 1700, 1800 can include an accelerometer to detect one or more tilt angles. The processor 1727 of the second circuit board 1700, 1800 can correct a liquid level measurement based on the one or more tilt angles.

The support tube 830 may be one of a straight support tube 831 and a curved support tube 832. In some embodiments, determining if liquid is present may include determining a level of liquid in a confined space. The circuit board may be a single circuit board 102 including at least one of a plurality of processors, one or more ladder circuits 1234, and/or other components. In some embodiments, each of the plurality of emitter/receiver pairs 108 may be included within one or more corner reflecting sensors.

Figure 16:
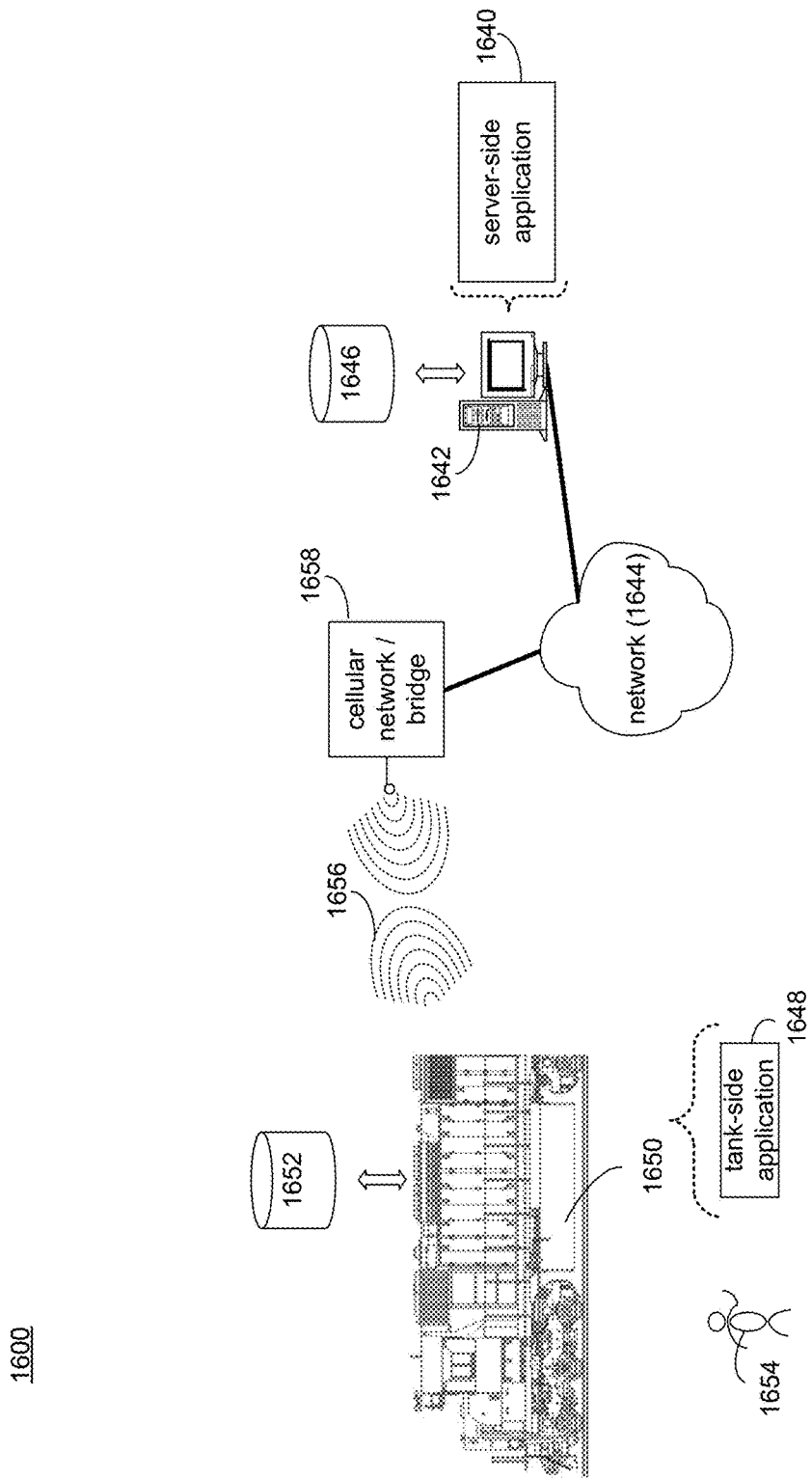
FIG. 16 is a diagrammatic view of a liquid level measurement report process coupled to a distributed computing network.

Referring now to FIG. 16, a liquid level measurement report process 1640 may be coupled to a computer or computer network. For example, server liquid level measurement report process 1640 may reside on and may be executed by server computer 1642, which may be connected to network 1644, examples of which may include but are not limited to: a local area network; a wide area network; or an intranet, for example. Examples of server computer 1642 may include, but are not limited to: a personal computer, a server computer, a series of server computers, a mini computer, a mainframe computer, a base station and/or a computing hub. Server computer 1642 may be a web server (or a series of servers) running a network operating system, examples of which may include but are not limited to: Microsoft® Windows Server®; Novell® Netware®; or Red Hat® Linux®, for example. (Microsoft and Windows are registered trademarks of Microsoft Corporation in the United States, other countries or both; Novell and NetWare are registered trademarks of Novell Corporation in the United States, other countries or both; Red Hat is a registered trademark of Red Hat Corporation in the United States, other countries or both; and Linux is a registered trademark of Linus Torvalds in the United States, other countries or both.)

The instruction sets and subroutines of server liquid level measurement report process 1640, which may be stored on storage device 1646 coupled to server computer 1642, may be executed by one or more processors (not shown) and one or more memory architectures (not shown) incorporated into server computer 1642. Storage device 1646 may include but is not limited to: a hard disk drive; a tape drive; an optical drive; a RAID array; a random access memory (RAM); and a read-only memory (ROM). Server computer 1642 may execute a web server application, examples of which may include but are not limited to: Microsoft® IIS, Novell® Web Server™, or Apache® Web Server, that allows for access to server computer 1642 (via network 1644) using one or more protocols, examples of which may include but are not limited to HTTP (i.e., HyperText Transfer Protocol), SIP (i.e., session initiation protocol), and the Lotus® Sametime® VP protocol. (Webserver is a trademark of Novell Corporation in the United States, other countries, or both; Apache is a registered trademarks of Apache Software Foundation in the United States, other countries, or both; Lotus and Sametime are registered trademarks of International Business Machine Corp. in the United States, other countries, or both.)

Tank liquid level measurement report process 1648 may reside on and may be executed by liquid tank electronic device 1650, examples of which may include, but are not limited to, personal computer, laptop computer, a data-enabled mobile telephone, notebook computer, personal digital assistant, smart phone and a dedicated network device for example. Liquid tank electronic device 1650 may be coupled to network 1644 and may each execute an operating system, examples of which may include but are not limited to Microsoft® Windows®, Microsoft Windows CE®, Red Hat® Linux®, or a custom operating system.

The instruction sets and subroutines of tank liquid level measurement report processes 1648 which may be stored on storage device 1652 coupled to tank electronic device 1650, may be executed by one or more processors and one or more memory architectures incorporated into liquid tank electronic device 1650. Storage devices 1652 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

User 1654 may access a liquid level measurement report process in various ways. For example, user 1654 may access server liquid level measurement report process 1640 directly through the device on which a liquid tank process (e.g., tank liquid level measurement report processes 1648) is executed, namely liquid tank electronic device 1650. User 1654 may access server liquid level measurement report process 1640 directly through network 1644. In one example, the liquid tank electronic device 1650 may be communicatively coupled with a liquid level detection apparatus 100. The liquid level detection apparatus 100 can be deployed in a locomotive fuel tank 1312 and configured to determine a liquid level for a locomotive fuel tank. A locomotive operator or engineer can access a liquid level measurement report process directly through the liquid tank electronic device 1650 to determine a fuel level within a locomotive fuel tank 1312.

Liquid tank electronic device 1650 is shown wirelessly coupled to network 1644 via wireless communication channel 1656 established between liquid tank electronic device 1650 and cellular network/bridge 1658, which is shown directly coupled to network 1644.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example.

It will be understood that tank liquid level measurement report process 1648 may, for example, interact and/or communicate with server liquid level measurement report process 1640 and/or may be executed within one or more applications that allow for communication with other server and/or tank liquid level measurement report processes. This is not intended to be a limitation of this disclosure, as other configurations are possible (e.g., liquid level measurement report process 1648 may include stand-alone tank processes and/or stand-alone server processes.) For example, some implementations may include server liquid level measurement report process 1640 in place of or in addition to tank liquid level measurement report process 1648.

In one embodiment, the tank liquid level measurement report process 1648 can receive a liquid level measurement from a liquid level detection apparatus 100. The tank liquid level measurement report process 1648 can receive condition information about the liquid tank including, but not limited to, liquid level measurement and location information via a global positioning system. In one example, the tank liquid level measurement report process 1648 can receive condition information about a locomotive and one or more locomotive fuel cars including, but not limited to, fuel level, location information via a global positioning system, temperature of the locomotive engine, the oil level of the locomotive, etc. The tank liquid level measurement report process 1648 can transmit a report including the condition information to the server computer 1642 as described above.

In another embodiment, the server liquid level measurement process 1640 can receive a report from the liquid tank electronic device 1650. The server liquid level measurement process 1640 can determine a liquid level measurement of the tank from the report. The server liquid level measurement process 1640 can be configured to send an alert or alarm when the received liquid level is, for example, too low or, in another example, too high based upon, at least in part, the received liquid level measurement. The server liquid level measurement process 1640 can transmit an alarm to the tank electronic device 1650 as described above.

The liquid level detection apparatus 100 can solve the problems in other liquid sensing methods, such as rheostat/float, head-pressure or capacitive, wherein the scale factor drifts away from its calibrated value over time and/or with different liquid properties. Additionally, no scale factor may be needed during production and development. The liquid level detection apparatus 100 can also address the shortcomings of ultrasonic liquid sensors wherein sloshing, angled installations or foamy surfaces prevent the sound pulses from bouncing cleanly back to the sensor's microphone. The liquid level detection apparatus 100 can measure liquid level electronically with no scale factor conversions, no settling tube and reliable measurements in different liquid mixes.

The liquid level detection apparatus 100 may not require calibration of scale factor because it can directly measure the presence of liquid at periodic distance intervals. Hence its measurement can be taken in the desired engineering units of distance (from the bottom of a liquid tank). It further may not require a settling tube and can measure sloshing liquid and/or liquid with a foaming surface.

As used in any embodiment described herein, the terms "circuit" and "circuitry" may include, for example, singly or in any combination, hardwired circuitry, programmable circuitry, state machine circuitry, and/or firmware that stores instructions executed by programmable circuitry. It should be understood at the outset that any of the operations and/or operative components described in any embodiment herein may be implemented in software, firmware, hardwired circuitry and/or any combination thereof. Embodiments of the present disclosure may be incorporated in whole or in part into any design tools.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system."

It will be apparent to those skilled in the art that various modifications and variations can be made in the embodiments of the present disclosure without departing from the spirit or scope of the present disclosure. Thus, it is intended that embodiments of the present disclosure cover the modifications and variations provided they come within the scope of the appended claims and their equivalents.

What is claimed is:
1. An apparatus comprising:
a circuit board including a plurality of mounted emitter/receiver pairs arranged vertically along the circuit board; and a processor configured to determine if liquid is present between at least one of the plurality of emitter/receiver pairs based upon, at least in part, a total output current from the plurality of emitter/receiver pairs, wherein the total output current is configured to increase for each mounted emitter/receiver pair of the plurality of mounted emitter/receiver pairs that detects liquid between an emitter and a receiver of a respective mounted emitter/receiver pair.

2. The apparatus of claim 1, further comprising:
a support tube configured to house the circuit board and the processor.

3. The apparatus of claim 2, wherein the support tube is configured to be deployed within a liquid storage tank.

4. The apparatus of claim 1, wherein determining if liquid is present includes determining a collector voltage at a photo transistor receiver associated with each of the plurality of emitter/receiver pairs.

5. The apparatus of claim 1, wherein the plurality of emitter/receiver pairs are each separated by an approximately equivalent distance on the circuit board.

6. The apparatus of claim 1, wherein the plurality of emitter/receiver pairs are each separated by a variable distance on the circuit board and wherein the variable distance between each of the plurality of emitter/receiver pairs corresponds to an equivalent change in a liquid level.

7. The apparatus of claim 1, wherein the circuit board includes a plurality of circuit boards that are electrically connected.

8. The apparatus of claim 2, wherein the support tube is one of a straight support tube and a curved support tube.

9. The apparatus of claim 1, wherein determining if liquid is present includes determining a level of liquid in a confined space.

10. The apparatus of claim 1, wherein the circuit board is a single circuit board including at least one of a plurality of processors or a ladder circuit.

11. The apparatus of claim 1, wherein each of the plurality of emitter/receiver pairs are included within one or more corner reflecting sensors.

12. The apparatus of claim 1, further comprising:
an accelerometer configured to detect one or more tilt angles.

13. The apparatus of claim 1, further comprising:
an accelerometer configured to detect one or more tilt angles to provide a correction to a liquid level for a non-stationary liquid.

14. A method for liquid level detection comprising:
providing a circuit board including a plurality of mounted emitter/receiver pairs arranged along the circuit board within a liquid containment area; and
determining, using one or more processors associated with the circuit board, if liquid is present between at least one of the plurality of emitter/receiver pairs based upon, at least in part, a total output current from the plurality of emitter/receiver pairs, wherein the total output current is configured to increase for each mounted emitter/receiver pair of the plurality of mounted emitter/receiver pairs that detects liquid between an emitter and a receiver of a respective mounted emitter/receiver pair.

15. The method for liquid level detection of claim 14, wherein the circuit board is enclosed within a support tube configured to house the circuit board and the processor.

16. The method for liquid level detection of claim 15, further comprising:
deploying the support tube within a liquid storage tank.

17. The method for liquid level detection of claim 14, wherein determining if liquid is present includes determining a collector voltage at a photo transistor receiver associated with each of the plurality of emitter/receiver pairs.

18. The method for liquid level detection of claim 14, wherein the plurality of emitter/receiver pairs are each separated by an approximately equivalent distance on the circuit board.

19. The liquid level detection apparatus of claim 14, wherein the plurality of emitter/receiver pairs are each separated by a variable distance on the circuit board and wherein the variable distance between each of the plurality of emitter/receiver pairs corresponds to an equivalent change in a liquid level.

20. The method for liquid level detection of claim 14, wherein the circuit board includes a plurality of circuit boards that are electrically connected.

21. The method for liquid level detection of claim 15, wherein the support tube is one of a straight support tube and a curved support tube.

22. The method for liquid level detection of claim 14, wherein determining if liquid is present includes determining a level of liquid in a confined space.

23. The method for liquid level detection of claim 14, wherein the circuit board is a single circuit board including at least one of a plurality of processors or a ladder circuit.

24. The method for liquid level detection of claim 14, wherein each of the plurality of emitter/receiver pairs are included within one or more corner reflecting sensors.

25. The method for liquid level detection of claim 14, wherein the circuit board includes an accelerometer configured to detect one or more tilt angles.

26. The method for liquid level detection of claim 14, further comprising:
an accelerometer configured to detect one or more tilt angles to provide a correction to a liquid level for a non-stationary liquid.

* * * * *